(12) United States Patent
Simak et al.

(10) Patent No.: US 11,042,477 B2
(45) Date of Patent: Jun. 22, 2021

(54) MEMORY MANAGEMENT USING SEGREGATED FREE LISTS

(71) Applicant: Huawei Technologies Co., Ltd., Guangdong (CN)

(72) Inventors: Aleksandr Aleksandrovich Simak, Shenzhen (CN); Peter Sergeevich Krinov, Shenzhen (CN); Xuecang Zhang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 149 days.

(21) Appl. No.: 16/366,725

(22) Filed: Mar. 27, 2019

(65) Prior Publication Data
US 2019/0220391 A1    Jul. 18, 2019

Related U.S. Application Data

(63) Continuation of application No. PCT/RU2016/000646, filed on Sep. 28, 2016.

(51) Int. Cl.
*G06F 12/02* (2006.01)
*G06F 16/901* (2019.01)

(52) U.S. Cl.
CPC ........ *G06F 12/023* (2013.01); *G06F 16/9024* (2019.01); *G06F 12/0253* (2013.01);
(Continued)

(58) Field of Classification Search
None
See application file for complete search history.

(56) References Cited

U.S. PATENT DOCUMENTS

| 5,742,793 A | 4/1998 | Sturges et al. |
| 6,839,822 B2 | 1/2005 | Knippel et al. |

(Continued)

FOREIGN PATENT DOCUMENTS

| CN | 102103541 A | 6/2011 |
| CN | 102455976 A | 5/2012 |

(Continued)

OTHER PUBLICATIONS

Dongying Han et al. A Design and Practice of Pointer Type Compiler in CML Language, Northeast Normal University, 2007. total 77 pages. With English abstract.

(Continued)

*Primary Examiner* — Yaima Rigol
(74) *Attorney, Agent, or Firm* — Womble Bond Dickinson (US) LLP

(57) ABSTRACT

The present disclosure is directed to a memory management method and to a memory management device arranged to execute memory allocation and/or memory deallocation by use of segregated free lists, which provide information on memory chunks, wherein the memory allocation and/or the memory deallocation are executed according to states of the memory chunks, and wherein the states of the memory chunks comprise: an used state indicating that a memory chunk, which is in used state, is in use, and is not available for allocation; a linked state indicating that a memory chunk, which is in linked state, is not used, is linked within a free list of the segregated free lists, and is available for allocation; a free state indicating that a memory chunk, which is in free state, is not used, is not linked within any of the segregated free lists, and is not available for allocation.

18 Claims, 8 Drawing Sheets

(52) U.S. Cl.
CPC ........... *G06F 2212/1016* (2013.01); *G06F 2212/1044* (2013.01)

(56) References Cited

U.S. PATENT DOCUMENTS

| | | |
|---|---|---|
| 7,610,468 B2 | 10/2009 | Madisetti |
| 2002/0144073 A1 | 10/2002 | Trainin et al. |
| 2003/0084263 A1 | 5/2003 | Knippel et al. |
| 2004/0168037 A1* | 8/2004 | Dearth ............ G06F 12/023 711/173 |
| 2005/0154851 A1* | 7/2005 | Charles ............ G06F 12/023 711/170 |
| 2005/0264576 A1* | 12/2005 | Sommers ............ G06T 17/00 345/543 |
| 2006/0190697 A1 | 8/2006 | Grant |
| 2007/0136385 A1* | 6/2007 | Abrashkevich ....... G06F 11/366 |
| 2009/0276602 A1 | 11/2009 | Chedru |
| 2010/0205374 A1* | 8/2010 | Meka ............ G06F 12/023 711/117 |
| 2014/0351547 A1* | 11/2014 | Dietterich ........ G06F 12/0284 711/170 |

FOREIGN PATENT DOCUMENTS

| | | |
|---|---|---|
| CN | 103984639 A | 8/2014 |
| CN | 106874220 A | 6/2017 |
| EP | 0706130 A1 | 4/1996 |

OTHER PUBLICATIONS

Paul R Wilson et al. Dynamic Storage Allocation: A Survey and Critical Review, Memory Management, Sep. 1995. total 78 pages. XP019179086.

Doug Lea, A Memory Allocator, retrieved from the internet: https://web.archive.org/web/20160923053550/http://g.oswego.edu/dl/html/malloc.html, Sep. 23, 2016, pp. 1-8, XP055373771.

* cited by examiner

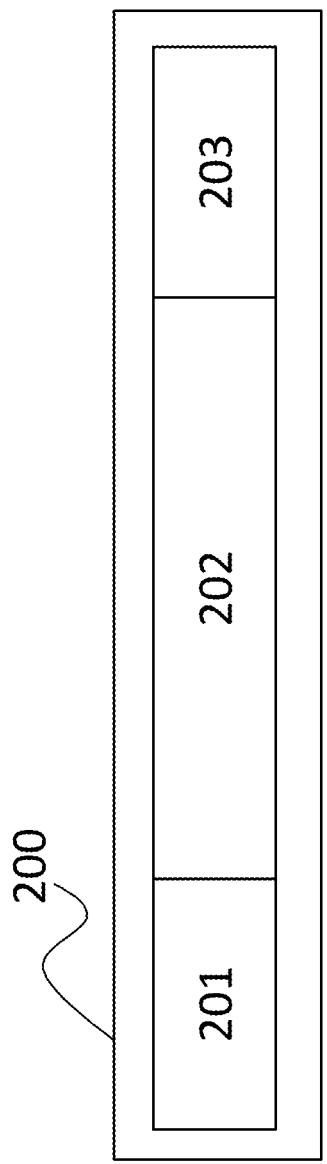
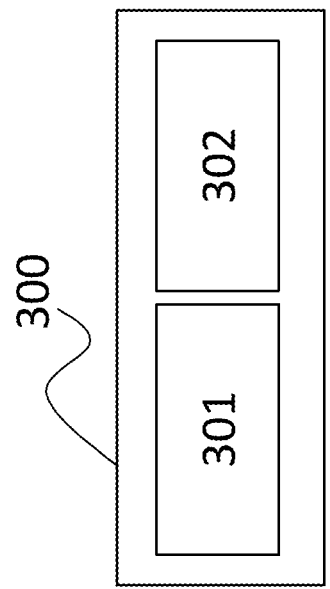

MEMORY MANAGEMENT USING SEGREGATED FREE LISTS

CROSS-REFERENCE TO RELATED APPLICATION

This application is a continuation of International Application No. PCT/RU2016/000646 filed on Sep. 28, 2016, the disclosure of which is hereby incorporated by reference in its entirety.

TECHNICAL FIELD

The present application is directed to a memory management method and device, both arranged to execute memory allocation and/or memory deallocation by use of segregated free lists, and further relates to a correspondingly arranged computer program product and to a correspondingly arranged computer-readable medium.

BACKGROUND

Memory management is essential in all computing systems and devices. The computations executed on the computing systems or devices and data handled in the computing systems or devices require memory resource(s) to function. Usually, memory resource management is provided by memory allocators. A typical memory allocator is a separate memory accounting facility completed with efficient interface to allocate and deallocate memory chunks of a requested size. In a computing system or device, the memory allocator is requested to provide a chunk of certain size for executing one or more processes and/or for storing data in the computing system or device. The memory allocator evaluates the request, checks if there is enough memory to serve it, prepares located chunk and returns the chunk address as a response to the request. Later, the memory allocator is informed that certain memory chunk is not in use any more. In response to this information, the memory allocator reclaims the chunk and optionally performs other actions, such as coalescing. Common issue of all memory allocators is a memory fragmentation (see, for example, Wilson, P. R.; Johnstone, M. S.; Neely, M.; Boles, D. (1995). "Dynamic Storage Allocation: A Survey and Critical Review". Memory Management: International Workshop, Iwmm'95, Kinross, Uk, Sep. 27-29, 1995: Proceedings), when there are a dozen small chunks available, but memory request for single larger chunk obviously could not be served. In order to avoid fragmentation, memory allocators perform adjacent chunks merging, also known as coalescing. Coalescing has generally known as inefficient with considerable overheads. Many memory allocators differ significantly on their coalescing schema with clear attempt to perform it more efficiently (see, for example, US 2003/0084263 A1, U.S. Pat. No. 7,610,468 B2, U.S. Pat. No. 5,742,793 A).

Different memory allocators have been already known for decades. Despite their distinct nature, many of them have some features in common, such as chunks boundary tags to support coalescing and link fields to compose linked lists of free chunks. Some memory allocators also use lookup tables, threat small objects differently, never split or coalesce and even deploy special data structures and algorithms such as quick lists and deferred coalescing to provide better performance (see, for example, Wilson, P. R.; Johnstone, M. S.; Neely, M.; Boles, D. (1995). "Dynamic Storage Allocation: A Survey and Critical Review". Memory Management: International Workshop, Iwmm'95, Kinross, Uk, Sep. 27-29, 1995: Proceedings).

The simplest memory allocator of such kind uses an array of free lists, where each list keeps free chunks of a particular size only. Free chunks become logically but not physically segregated by their size casting down lookup cost dramatically. More advanced variations of this scheme deploy boundary tags and doubly-linked lists to support general split and coalescing. Straightforward design choice is immediate coalescing on deallocate when reclaiming chunk undergo an attempt to be merged with its neighbors, but deferred mechanisms are also possible.

Implementations with immediate coalescing known to suffer from repeatedly performing merge on each small chunk deallocate and splitting it soon on consequent allocation. Deferred coalesce solves this issue conducting merge only on some occasion and operating a number of chunks at once. This approach still experiences certain difficulties, because chunks must be located first and merge also implies chunks extraction from their free lists, which leads to memory updates of linked chunks. Those are non-local memory updates in the worst case. As an alternative solution, caching data structure called Quick Lists can be used for newly reclaimed chunks. Recently freed chunks are placed there and no links established between them, thus it leads to quite relaxed merging opportunities. However, it certainly increases the complexity of final memory allocator design and implementation.

There are two known exemplary implementations for mentioned concepts above, which are considered in the following in more detail.

The first implementation is provided by Doug Lea in the year 2000 and described by the following website: http://g.oswego.edu/dl/html/malloc.html. The first implementation, provided by Doug Lea, evolved through time, but two core components of the algorithm, in particular, boundary tags and binning—remained solid and unchanged ground since the earliest versions.

According to the first implementation, there are both header at the beginning and footer in the end of every chunk. These auxiliary fields are called boundary tags. The header includes denoted chunk size and status whether the memory is available or already in use, while the footer generally consists of the chunk size only. Primary purpose of boundary tags is effective coalescing. Another capability of boundary tags is memory traversing. Memory can be traversed starting from arbitrary chunk in either a forward or backward direction.

According to the first implementation, free memory chunks are organized in bins grouped by size. Each free chunk includes two additional fields pointing to the next and previous chunks of the same bin. Since each free chunk must contain both boundary tags and bin links, the smallest allocable chunk is 16 bytes for 32-bit and 24 bytes for 64-bit systems. Chunks within one bin form doubly-linked list and are also ordered by size. There are 128 fixed-width approximately logarithmically spaced bins. All bins for less than 512 bytes chunks hold one size only and are spaced 8 byte apart.

Further, in the first implementation, lookups for requested size chunks are processed in smallest-first order providing exact best-fit strategy. After chunk is allocated to the program, the reminder of the chunk is marked as free and added to the corresponding bin list. On release, the reclaimed chunk is coalesced with its neighbors immediately. A number of potential optimization had been discussed. However, the heuristics for deferred coalescing used by the algorithm tend to degrade the performance. Thus, there is no good deferred coalescing mechanism known for Lea's allocator at this time.

The general categorization of this memory allocator is best-fit doubly-linked segregated lists with immediate coalescing.

The second implementation is described in US 2006/0190697 A1. In the second implementation, memory chunks have only header, bins called free-list table, doubly-linked lists updated to singly-linked lists with address ordering, and so called delayed coalescing been introduced as an effective replacement of immediate coalescing.

In the second implementation, two approaches for delayed coalescing are used. The first is implemented by walking the whole heap and merging adjacent free chunks. Another one uses additionally allocated array with free chunks addresses of particular table bin. Coalescing starts with table bin of the smallest chunk size. The coalescing process sorts the array checking if chunks are adjacent. Two adjacent chunks are merged and pushed to the next bin free-list. Remaining chunks reengage new free-list of the current bin. Then the process continues with next chunk size bin. Both approaches of the second implementation perform on demand or by predefined triggers.

The first implementation suffers from repeatedly performing merge on each deallocate of even small chunk and splitting it soon on consequent allocation, as mentioned above. It is especially wasteful for non-DRAM (Dynamic Random Access Memory) tier, such as SCM (Storage Class Memory), since every memory update related to the boundary tags or free-list structure must be reliably flushed from CPU (Central Processing Unit) cache to the actual hardware memory cell. For instance, chunk extraction from doubly-linked free-list costs 2 memory updates: one for previous and one for next linked chunk. Thus, the extraction of both chunks adjacent to the chunk neighbors costs 4 memory updates already. Chunks in the free-list are sorted by size and thus can actually be physically distanced. In that case memory accesses and consequent updates are non-local.

The second implementation deploys singly-linked free-lists and delayed coalescing. Decided design has fixed some of first implementation's caveats, but poses other issues to the front as payback. Indeed, only single memory update is required to extract chunk from the free-list. Also, there is no need to update link field on such case since delayed coalescing operates once in a while walking through the entire free-list. Thus, the second implementation does not suffer repeatedly performing the same job of merge and split chunks. However, an additional array with free chunks addresses required and also this array has to be sorted and scanned later checking for adjacent chunks. Since delayed coalescing performs separately on free-list of every table bin, total operations number for arrays allocation, sorting, memory accesses and updates is enormous.

Thus, in view of the above summary of known memory management approaches, further memory management methodologies and devices enabling an efficient memory allocation and/or deallocation are required. Further, it is desirable to provide memory management methodologies and devices that improve memory reclamation mechanism despite the continuously or permanently executed memory allocations and/or deallocations.

SUMMARY

Consequently, the object of the present disclosure is to provide a memory management method and device that enable an improved memory management, in particular, an improved memory allocation and/or memory deallocation.

The object of the present disclosure is achieved by the solution provided in the enclosed independent claims. Advantageous implementations of the present disclosure are further defined in the respective dependent claims, in the present description, and/or in the appended figures.

The present disclosure proposes a mechanism that overcomes at least the above-mentioned drawbacks. The present disclosure suggests to handle the memory allocation and/or deallocation by use of segregated free lists because the structure of the segregated free lists is efficient and easy to handle. Thus, the present disclosure by utilizing segregated free lists, is based on the efficiency which is inherent for segregated free lists. Furthermore, the efficiency of the memory allocation and/or deallocation is increased by implementing three states of memory chunks, which simplify the management of the memory chunks and also contribute to the total efficiency of the memory allocation and/or deallocation when handling the memory allocation and/or deallocation according to the three states. Additionally, the memory reclamation mechanism is improved, despite the continuously or permanently executed memory allocations and/or deallocations, by implementing the three states of memory chunks and by handling the memory allocation and/or deallocation according to the three states.

According to a first aspect, a memory management method is provided, which is arranged to execute memory allocation and/or memory deallocation by use of segregated free lists, which provide information on memory chunks, wherein the device is configured to execute the memory allocation and/or the memory deallocation according to states of the memory chunks, and wherein the states of the memory chunks comprise: an used state indicating that a memory chunk, which is in used state, is in use, and is not available for allocation; a linked state indicating that a memory chunk, which is in linked state, is not used, is linked within a free list of the segregated free lists, and is available for allocation; a free state indicating that a memory chunk, which is in free state, is not used, is not linked within any of the segregated free lists, and is not available for allocation; wherein the memory management method is configured to execute the memory allocation by: finding within a free list of the segregated free lists a memory chunk, unlinking the found memory chunk from the free list of the segregated free lists, and setting the state of the found memory chunk to the used state; verifying whether a right-adjacent memory chunk of the found memory chunk in memory is in the free state; and if the right-adjacent memory chunk is in the free state, linking the right-adjacent memory chunk into a corresponding free list of the segregated free lists and setting the state of the right-adjacent memory chunk to the linked state; wherein the memory management method is configured to execute the memory deallocation by: verifying the state of a left-adjacent memory chunk of the memory chunk in memory, with regard to which the memory deallocation is executed; and if the left-adjacent memory chunk is in the used state, setting the state of the memory chunk to the linked state and linking the memory chunk within a corresponding free list of the segregated free lists; if the left-adjacent memory chunk is in the linked state, setting the state of the memory chunk to the free state; if the left-adjacent memory chunk is in the free state, merging the memory chunk and the left-adjacent memory chunk to a new memory chunk and setting the state of the new memory chunk to the free state.

In a first possible implementation according to the first aspect, the segregated free lists are singly-linked. In this way, the efficiency of the structure of segregated free lists is increased, wherein less memory is required for storing the segregated free lists. Thus, a more efficient memory allocation and/or deallocation can be executed.

In a second possible implementation form according to the first aspect as such or according to the first implementation form of the first aspect, the memory management method is configured to execute the memory allocation by terminating the memory allocation action if the right-adjacent memory chunk of the found memory chunk in memory is not in the free state.

In a third possible implementation form according to the first aspect as such or according to the any of the preceding implementation forms of the first aspect, each memory chunk of the memory chunks comprises a header and a footer, and wherein the header and/or the footer indicates the state of the respective memory chunk.

In a fourth possible implementation form according to the third implementation form of the first aspect, the memory management method is configured to execute the merging of the memory chunk and of the left-adjacent memory chunk by merging a footer of the left-adjacent memory chunk and a header of the memory chunk to an area for storage of data.

According to a second aspect, a memory management device is provided that is arranged to execute memory allocation and/or memory deallocation by use of segregated free lists, which provide information on memory chunks, and according to states of the memory chunks, and wherein the states of the memory chunks comprise: an used state indicating that a memory chunk, which is in used state, is in use, and is not available for allocation; a linked state indicating that a memory chunk, which is in linked state, is not used, is linked within a free list of the segregated free lists, and is available for allocation; a free state indicating that a memory chunk, which is in free state, is not used, is not linked within any of the segregated free lists, and is not available for allocation; wherein the memory management device is configured to execute the memory allocation by: finding within a free list of the segregated free lists a memory chunk, unlinking the found memory chunk from the free list of the segregated free lists, and setting the state of the found memory chunk to the used state; verifying whether a right-adjacent memory chunk of the found memory chunk in memory is in the free state; and if the right-adjacent memory chunk is in the free state, linking the right-adjacent memory chunk into a corresponding free list of the segregated free lists and setting the state of the right-adjacent memory chunk to the linked state; wherein the memory management device is configured to execute the memory deallocation by: verifying the state of a left-adjacent memory chunk of the memory chunk in memory, with regard to which the memory deallocation is executed; and if the left-adjacent memory chunk is in the used state, setting the state of the memory chunk to the linked state and linking the memory chunk within a corresponding free list of the segregated free lists; if the left-adjacent memory chunk is in the linked state, setting the state of the memory chunk to the free state; if the left-adjacent memory chunk is in the free state, merging the memory chunk and the left-adjacent memory chunk to a new memory chunk and setting the state of the new memory chunk to the free state. Particularly, the memory management device is configured to execute the steps of the memory management method described herein.

According to a third aspect, the present disclosure refers to a computer program product comprising computer readable program code that is configured to cause a computing device to execute steps of the memory management method introduced above and explained in more detail below.

According to a third aspect, the present disclosure relates to a computer-readable recording medium configured to store therein said computer program product.

BRIEF DESCRIPTION OF THE DRAWINGS

FIG. 2 shows an exemplary arrangement of a memory chunk according to an embodiment of the present disclosure.

FIG. 3 shows an exemplary arrangement of a footer or of a header of a memory chunk according to an embodiment of the present disclosure.

DETAILED DESCRIPTION

Generally, it has to be noted that all arrangements, devices, modules, components, models, elements, units, entities, and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present disclosure and its various steps are embodied in the functionalities of the various described apparatus elements.

Moreover, any of the embodiments and features of any of the embodiments, described herein, may be combined with each other, unless a combination is explicitly excluded.

Figure 1:
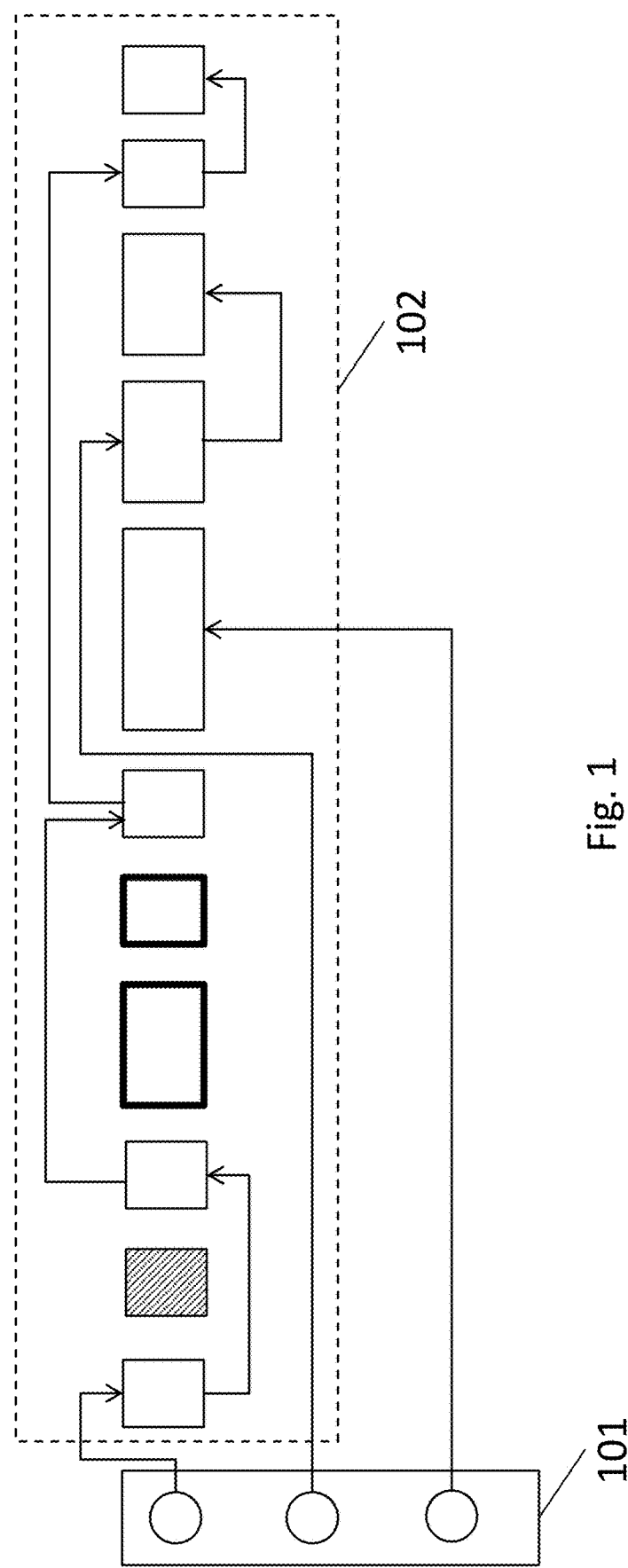
FIG. 1 shows an exemplary arrangement of segregated free lists according to an embodiment of the present disclosure.

FIG. 1 shows an exemplary arrangement of segregated free lists according to an embodiment of the present disclosure. Generally, the term of a "segregated free list" has a well-established meaning in the area of memory allocation and/or deallocation. Segregation is a simple and efficient mechanism, which uses and manages a set of free lists. The term "free lists" means that the memory blocks or memory chunks respectively held or linked in the lists are free and can be allocated. Further, each free list holds memory blocks or memory chunks respectively of a particular size. The free list, used for allocation and/or deallocation of a memory chunk, is thus chosen in dependence of the size of the memory block or memory chunk respectively. If, for example, a memory chunk of size X is requested, a corresponding free list that holds memory chunks of at least the size X will be used for allocating a corresponding memory chunk. If a further request requests a memory chunk of size Y, a corresponding free list that holds memory chunks of at least the size Y will be used for allocating a corresponding memory chunk. In this way, it is possible that for both requests different free lists will be used. I.e. the list, from which a memory chunk will be used in response to the request for a memory chunk of size X, may be different from the list, from which a memory chunk will be used in response to the request for a memory chunk of size Y. The one list will be a list holding memory chunks of size that is at least X, the another list will be a list holding memory chunks of size that is at least Y. The present disclosure utilizes and benefits from the simplicity and efficiency of the segregated free lists structure.

FIG. 1 shows an exemplary arrangement of segregated free lists according to an embodiment of the present disclosure. As shown in FIG. 1, a memory or a memory block 102 is split into smaller memory blocks or chunks of different sizes. In FIG. 1, said memory chunks are shown as rectangles of different sizes in the memory frame 102, wherein the different sizes of the rectangles symbolize or reflect different sizes of the memory chunks.

The segregated free lists are managed by a free-list table or array 101. The free-list table or array 101 has, according to the present embodiment, a fixed size. Each item in the free-list table or array 101 is shown in FIG. 1 as a circle and is referred to as a bin that contains a pointer to a free list. In FIG. 1, this is shown by the arrows leading from the bins (shown as circles in free-list table or array 101) to first entries of the respective free lists, wherein each of the free lists comprises or holds memory chunks of a particular (e.g., pre-determined) size, and wherein each of the free lists holds memory chunks, size of which is different from the memory chunks in another free list. Each of the free lists is represented in FIG. 1 by a chain of memory chunks (shown as rectangles in memory or memory block 102) having the same size, wherein a pointer from a memory chunk to a next memory chunk is provided (see in FIG. 1 the arrows leading from one memory chunk to another memory chunk). The last entry of a free list, i.e. the last memory chunk of a free list does not have a pointer to a next memory chunk because it is the last entry or memory chunk of the respective list. Although FIG. 1 shows a free list table or array 101 with three items or bins only, the number of three is just exemplary, and any appropriate number of free lists may be managed by the free list table or array 101.

As shown by different presentations of the memory chunks in FIG. 1, according to the present embodiment, the memory chunks have three different states: a used state, a linked state, and a free state, as mentioned above. In FIG. 1, memory chunks of the memory or memory block 102 that are in used state are shown as shaded rectangles. A memory chunk that is in used state is a memory chunk that is in use (i.e. is used for data storage) and is not available for allocation. Further, in FIG. 1, memory chunks of the memory or memory block 102 that are in linked state are shown as white rectangles with thin frames. A memory chunk that is in linked state is a memory chunk that is not used, is linked within a respective free list of the segregated free lists and is available for allocation. Additionally, in FIG. 1, memory chunks of the memory or memory block 102 that are in free state are shown as white rectangles with bold frames. A memory chunk that is in free state is a memory chunk that is not used, is not linked within a respective free list of the segregated free lists (this is shown in FIG. 1 in that memory chunks, which are in free state, do not have pointers to other memory chunks (in FIG. 1 no arrows leading to other memory chunks) and also do not have pointers (in FIG. 1 arrows) that point to or lead to the respective memory chunks) and is not available for allocation.

Thus, as shown in FIG. 1, the memory or memory block 102 is split into a plurality of memory chunks, some of which are hold by the free lists of the segregated free lists and other of which are not hold by the free lists of the segregated free lists. The expression "linked within a free list" means that the respective memory chunk, which is linked within a free list of the segregated free lists, is held by the free list, i.e. is an entry of the free list. Because memory chunks, which are used, are removed from the free lists, a memory chunk, which is linked within a free list, is generally available for allocation. The expression "unlink from a free list" means that the respective memory chunk, which is unlinked from a free list of the segregated free lists, is removed from the respective free list, i.e. the memory chunk is no longer an entry of the free list and is not held by the free list. Because only memory chunks that are linked in one of the free lists of the segregated free lists are used for allocation, an unlinked memory chunk is not available for allocation after its unlinking from a free list. Usually, a memory chunk is unlinked from a free list if it is chosen for allocation and will be/is used for data storage, i.e. has the used state.

In FIG. 2, an exemplary arrangement of a memory chunk 200 according to an embodiment of the present disclosure is shown. Thus, the memory chunks shown in FIG. 1 are, for example, arranged as shown in FIG. 2. According to the present embodiment, the memory chunk 200 comprises a header or header tag 201 and a footer or footer tag 203. Further, the memory chunk 200 comprises a data field 202, in which the data is stored during the use of the memory chunk 200. Said data field 202 is referred to also as payload. The header or header tag 201 of the memory chunk 200 is located at the beginning of the memory chunk 200, and the footer or footer tag 203 of the memory chunk is located at the end of the memory chunk 200.

In particular, these fields (i.e. the header 201 and the footer 203) are for the internal use of the memory allocation and/or deallocation only. In this case, the header 201 and the footer 203 are accessible by memory allocator or memory management device only and are not accessed by devices or applications that use the data field or payload 202 of the memory chunk 200 for data storage.

According to an embodiment, the header 201 and the footer 203 have the size of 8 bytes.

FIG. 3 shows an exemplary arrangement of a footer or of a header 300 of a memory chunk according to an embodiment of the present disclosure. The memory chunk is arranged, for example, as shown in FIG. 2. Thus, the footer or header 300 of FIG. 3 is the header 201 or the footer 203 of the memory chunk 200 of FIG. 2. According to the present embodiment, the footer or header 300 (e.g. header 201 and/or footer 203) comprises a state field 302 indicating the state of the chunk 200 (i.e. used state, linked state, or free state). Additionally, according to the present embodiment, the footer or header 300 (e.g. header 201 and/or footer 203) comprises a size field 301 indicating the size of the chunk

200. The size field 301 indicates, for example, the size of the payload or data field 203 of the memory chunk 200.

According to an embodiment, the memory or memory buffer 102 is aligned to 8 bytes. Thus, according to this embodiment, the sizes of the memory chunks 200 are multiple of 8. Further, also each of the headers 201, 300 and of the footers 203, 300 of the memory chunks 200 have the size of 8 bytes. It implies that in the header 201, 300 and/or in the footer 203, 300, besides the size field 301, least three bits are unused and are used for indicating the state 302 of the memory chunk 200. This allows, for example, the following exemplary encoding of the state information in the state field 302, comprising said last three bits: "0x00" for indicating a free state, "0x01" for indicated a linked state, and "0x02" for indicating a used state.

Figure 4:
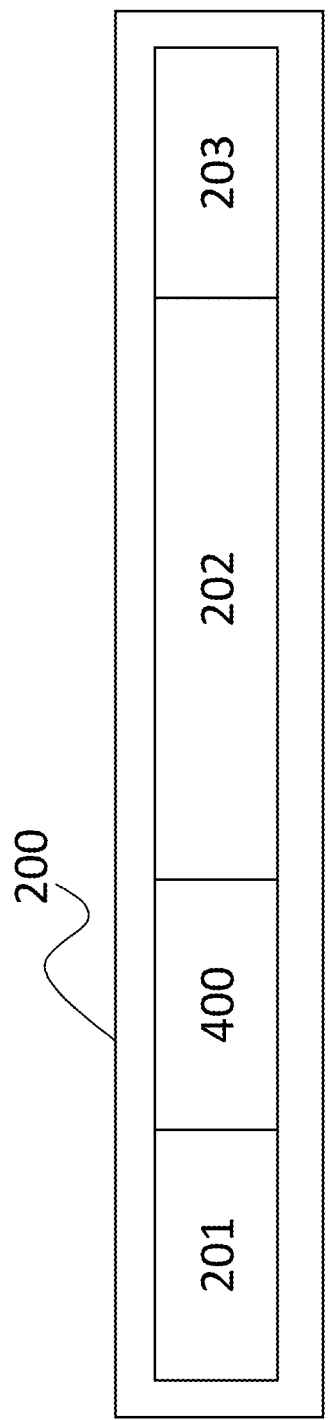
FIG. 4 shows an exemplary arrangement of a memory chunk that is in a linked state according to an embodiment of the present disclosure.

FIG. 4 shows an exemplary arrangement of a memory chunk that is in a linked state. The memory chunk is, for example, the memory chunk of FIG. 2. The state field 302 of the header 201, 300 and/or of the footer 203, 300 indicates that the state of the memory chunk 200 is used state or linked state. Besides the header 201, data field or payload 202, and footer 201, the memory chunk 200 comprises also a pointer field 400 because the memory chunk 200 is held by one of the segregated free lists, i.e. is linked in one free list of the segregated free lists. The pointer field 400 is adjacent to the header 201 of the memory chunk 200 and is arranged at the beginning of the payload or data field 202.

Thus, according to an embodiment of the present disclosure, the arrangement of a memory chunk 200 changes if it is added to or linked within a corresponding free list of segregated free lists. In this case, the front part of the data field or payload field 202 of the memory chunk 200 is used as the pointer field 400. If the memory chunk 200 is removed from the corresponding free list, the pointer in the pointer field 400 is cleared or deleted, and the payload or data field 202 does not comprise any pointer field 400, i.e. the memory chunk 200 is arranged as shown in FIG. 2. Generally, memory chunks 200 that are in free or used state are arranged as shown in FIG. 2 and do not comprise the pointer field 400.

The pointer field 400 comprises a pointer to a next memory chunk 200 of the free list of the segregated free lists, which holds the memory chunk 200 and/or in which the memory chunk 200 is linked. According to an embodiment, the pointer field 400 comprises an offset of the next memory chunk 200, wherein the offset is the offset of the next memory chunk 200 relatively to a particular or predetermined base memory address of the memory or memory block 102. According to an alternative embodiment, the pointer field 400 comprises an ordinary pointer to the next memory chunk 200, which points to the memory address of the next memory chunk 200 in the memory or memory block 102.

According to an embodiment, the pointer field 400 has the size of 8 bytes. This arrangement of the pointer field 400 is useful in particular in cases where the memory or memory buffer 102 is aligned to 8 bytes and/or where the header 201 and the footer 203 have the size of 8 bytes. The setting of the pointer field 400 to the size of 8 bytes has the advantage of an easier handling of the respective memory chunk 200 and, in particular, of its payload or data field 202.

As described above, every memory chunk 200, which is in linked state, belongs to a certain free list of the segregated free lists depending on the size of the memory chunk 200. According to an embodiment, the structure of segregated free lists comprises 28 bins or free lists respectively. According to this embodiment, first 6 bins are spaced linearly 8 bytes apart covering payload size from 16 up to 64 bytes (i.e., the respective memory chunks 200 of said first 6 bins have payload or data fields 202 having the size from 16 up to 64 bytes), following bins are quadratic and bin payload size is computed as 2 to the power of bin number, wherein the numbering starts with the bin or free list holding the smallest memory chunks 200 and ends with the bin or free list holding the largest memory chunks 200. Memory chunks 200 larger than 128 megabytes are all placed to the last bin free-list.

Figure 5:
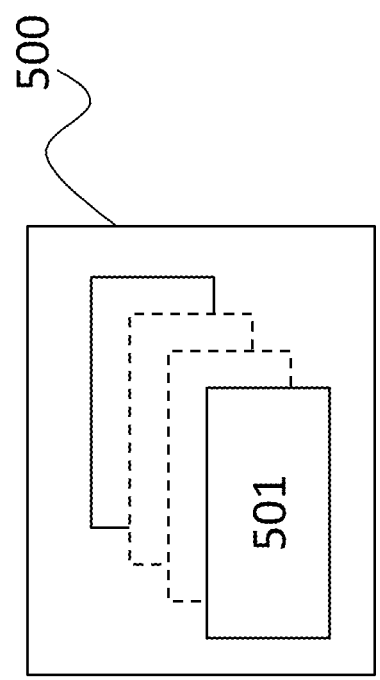
FIG. 5 shows an arrangement of a memory management device according to an embodiment of the present disclosure.

FIG. 5 shows an arrangement of a memory management device 500 according to an embodiment of the present disclosure. The memory management device 500 represents, for example, the allocator mentioned already herein. According to the present embodiment, the memory management device 500 is arranged to execute memory allocation and/or memory deallocation, as described herein, by use of segregated free lists, which provide information on memory chunks 200, and according to states of the memory chunks 200, comprising: a used state, a linked state, and a free state, as discussed herein. The memory allocation and/or deallocation as executed by the memory management device or allocator 500 according to the present embodiment have been introduced above and will be discussed in more detail below. The memory management device 500 comprises at least one processing unit 501 such as processor, central processing unit (CPU), microprocessor, multi-core processor etc. Thus, the memory allocation and/or deallocation are executed by the memory management device 500 by one or more processing units 501.

Figure 6:
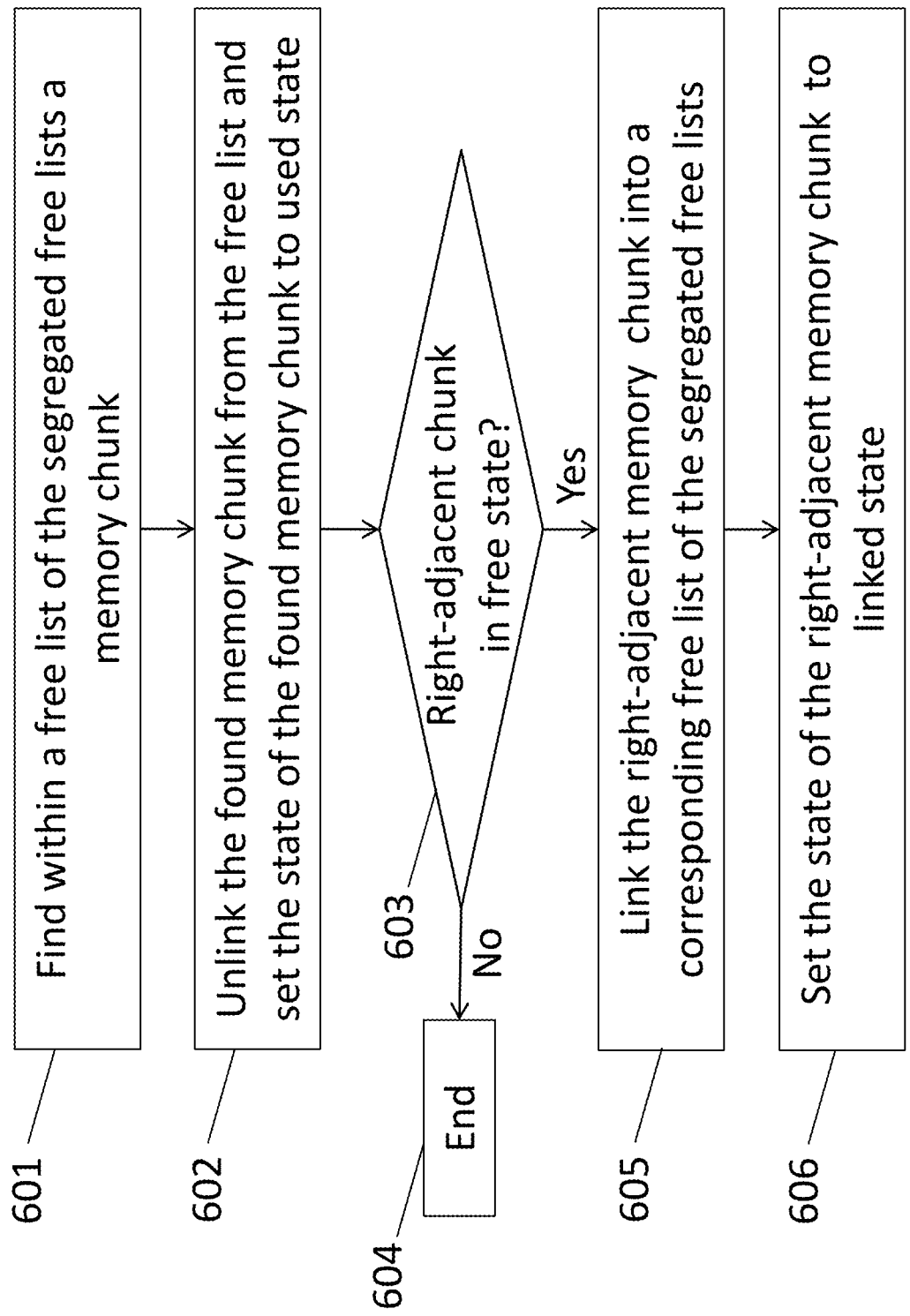
FIG. 6 shows a flow-diagram of memory allocation according to an embodiment of the present disclosure.

FIG. 6 shows a flow-diagram of memory allocation according to an embodiment of the present disclosure. As indicated above, the steps of the memory allocation are executed, for example, by the memory management device 500. Particularly, said steps are executed by the one or more processing units 501 of the memory management device 500.

In step 601, a received memory allocation request is present by use of which a memory block or memory chunk 200 of a particular size is requested. The memory allocation request may be issued by a further device, configured to process data, or by an application. Further, the memory allocation request is directed to allocation of a memory block or chunk 200 having a particular size. The particular size is defined by the further device, configured to process data, or by the application as the further device or application are able to estimate the memory space required for data storage in view of the data processing process(es) executed by the further device or application. In response to the presence (e.g., reception) of the memory allocation request (e.g., by the allocator or memory management device 500), the memory allocation as exemplary shown in FIG. 6 is executed.

Thus, in step 601, a free list of the segregated free lists is sought which comprises a suitable memory chunk 200 that is in a linked state (i.e. is not used and is available for allocation). Here, in particular, a free list is sought, which holds one or more memory chunks 200 of a size that is equal to or greater than the size of the requested memory block.

In step 602, the found memory chunk 200 is unlinked from the free list, in which it was found. I.e., the found memory chunk 200 is removed from the respective free list. The used state is noted in the state field 302 of the footer 201, 300 and/or of the header 203, 300 of the found memory chunk 200.

In step 603, the right-adjacent memory chunk of the found memory chunk 200 in the memory or memory block 102 is verified. Thus, the verification 603 does not refer to the right-adjacent memory chunk 200 in the free list, in which the memory chunk 200 was found 601, but the right-adjacent memory chunk 200 located to the right of the found memory chunk 200 in the memory or memory block 102. In particular, the state field 302 of the footer 201, 300 and/or of the header 203, 300 of the right-adjacent memory chunk 200 is verified 603.

If the state field 302 of the footer 201, 300 and/or of the header 203, 300 of the right-adjacent memory chunk 200 indicates a free state (i.e. if the right-adjacent memory chunk 200 of the found memory chunk 200 in the memory or memory block 102 is not used, is not linked in or held by any one free list of the segregated free lists and is not available for allocation), the right-adjacent memory chunk 200 is linked into a corresponding free list of the segregated free lists. The corresponding free list is identified according to the size of the right-adjacent memory chunk 200. I.e. a free list is sought, which comprises memory chunks 200 of the same size as the right-adjacent memory chunk 200. In this free list of the segregated free lists, the right-adjacent memory chunk 200 is inserted in step 605. I.e., the right-adjacent memory chunk 200 is linked into the corresponding free list. Additionally, in step 606, the state of the right-adjacent memory chunk 200 is set to the linked state. I.e. in the state field 302 of the right-adjacent memory chunk 200 the linked state is noted. In this way, a further memory chunk 200, being the right-adjacent memory chunk 200 of the found memory chunk 200, is made available for memory allocation.

If the state field 302 of the footer 201, 300 and/or of the header 203, 300 of the right-adjacent memory chunk 200 does not indicate a free state but a used state or a linked state, the processing according to the present embodiment ends 604. No further steps are executed with regard to the right-adjacent memory chunk 200.

Figure 7A:
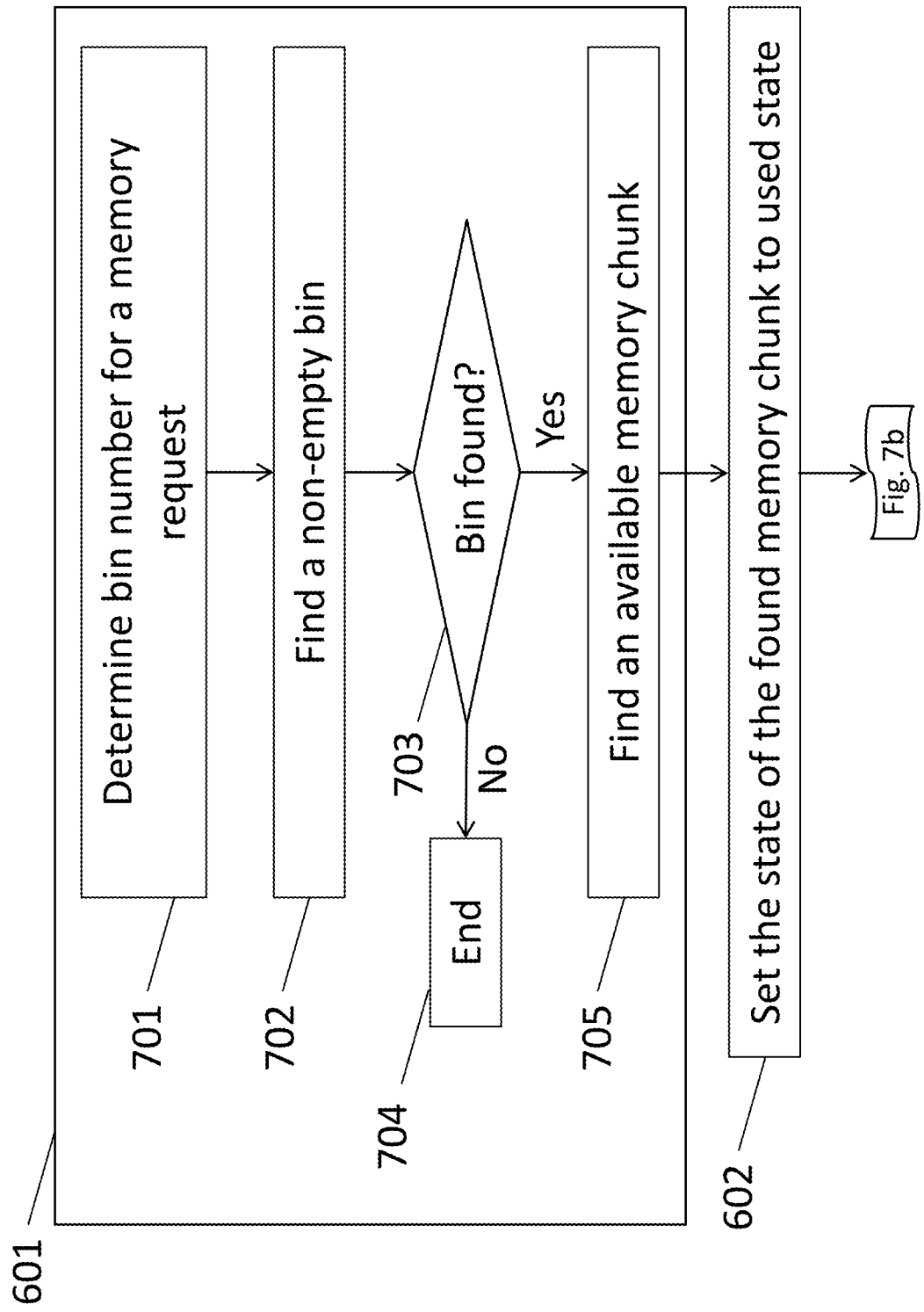
FIGS. 7a, 7b show a further flow-diagram of memory allocation according to an embodiment of the present disclosure.
Figure 7B:
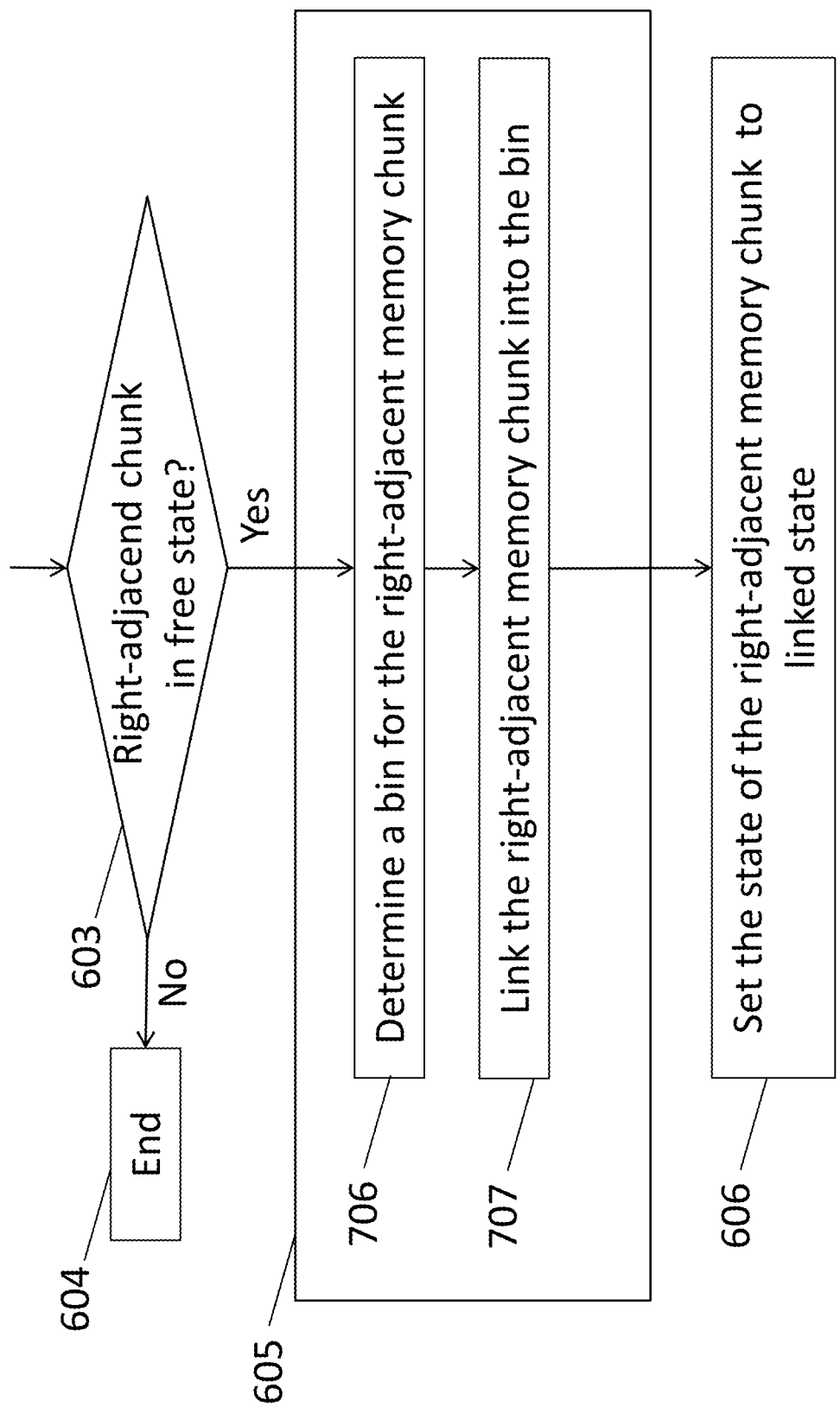

FIGS. 7a and 7b show a further flow-diagram of memory allocation according to an embodiment of the present disclosure. The steps of the memory allocation according to FIGS. 7a and 7b are executed, for example, by the memory management device 500. Particularly, said steps are executed by the one or more processing units 501 of the memory management device 500. The embodiment of FIGS. 7a and 7b is based on the embodiment of FIG. 6 and, particularly, supplements the embodiment of FIG. 6 by further steps.

Steps 701 to 705 of FIGS. 7a and 7b are provided, according to the present embodiment, as sub-steps of step 601, in which an appropriate memory chunk is sought, as described above.

In step 701, a bin number or a number of a free list of the segregated free lists respectively for a memory allocation request is computed. As mentioned above, the free lists of the segregated free lists, managed by the free-list table or array 101, of bins of the free-list table or array 101 may be enumerated, wherein a free list holding the smallest memory chunks 200 and the bin pointing to this free list have the smallest or minimum number and wherein a free list holding the largest memory chunks 200 and the bin pointing to this free list have the greatest or maximum number. The free lists or bins respectively are enumerated in an ascending order. Thus, the number of a free list or of a bin reflects the size of the memory chunks 200 hold by the respective free list. In step 701, the free lists of the segregated free lists of the free-list table or array 101 are considered and, each time a free list is considered, the size of the requested memory block or chunk 200 is compared with the sizes of the memory chunks 200 hold by the respective free list. The considering of the free lists of the segregated free lists of the free-list table or array 101 is done, for example, by running through the items of the free-list table or array 101, by considering, for each item, the bins of the item and by considering the free list, to which the bin points to. If the size of the requested memory block or chunk 200 is equal to or smaller than the sizes of the memory chunks 200 hold by a free list, the search is stopped and the free list represents the sought free list.

As mentioned, the search for the appropriate free list is done, for example, by use of the free-list table or array 101, e.g. by running through the items of the free-list table or array 101. Here, several known search techniques may be used. The search in the free-list table or array 101 for a free list or bin respectively, holding memory chunks 200 of an appropriate size, i.e. of size that is greater than or equal to the size of the requested memory chunk 200, is generally known, and many different search methods are known and present.

The output of the step 701 is the number of the free-list or bin respectively that has been found when executing the search of step 701.

In step 702, a non-empty bin or free list respectively is searched. In step 701, a number of a bin or free list is found, size of memory chunks 200 of which is greater than or equal to the size of the requested memory chunk 200. However, it is not ensured that the corresponding bin or free list respectively, having the found 701 number, comprises memory chunks 200 that are available for allocation. It may occur, that all memory chunks 200, which are/were hold/held by the corresponding bin or free-list, number of which was found in step 701, are in use when step 702 is executed and that no memory chunk 200 having the linked state is available in said free list. Therefore, it is verified in step 702, whether the corresponding bin or free list respectively, number of which was found in step 701, comprises or holds at least one memory chunk 200, which has a linked state and is, thus, available for allocation. For this purpose, at first, the respective bin or free list having the number determined in step 701 is considered. If the respective bin or free list comprises or holds at least one memory chunk 200, the respective bin or free list is determined as the non-empty bin or free list, memory chunks 200 of which may be used for the allocation. Otherwise, the verification step 702 continues with a next bin or free list having the next number in the free-list table or array 101, i.e. holding memory chunks 200 of the next size. In this way, the verification step 702 is executed again and again until a non-empty bin or free list respectively has been found. The term "non-empty" refers to a bin of free list respectively holding or having at least one memory chunk 200. The execution of the step 702 terminates when an appropriate non-empty bin or free list respectively has been found or after the consideration of all bins or free lists respectively in the free-list table or array 101, numbers of which are greater than the number found in step 701 and/or memory chunk 200 sizes of which are greater than or equal to the size of the requested memory chunk.

In step 703, it is verified whether a non-empty bin or free list respectively has been found. If in step 702 no non-empty bin or free list respectively has been found, the execution of step 601 and of the allocation procedure is ended. Because the memory allocation request for the memory chunk or memory block still exists, the procedure will be started again at a later time.

If in step 702 a non-empty bin or free list respectively has been found, an available memory chunk 200 is sought in step 705 in the bin or free list found in step 702. Here, the term "available memory chunk" means a memory chunk 200 state of which is a linked state. Because the found bin or free list respectively is non-empty, at least one memory chunk 200 will be present in the found bin or free list respectively. The choice of an available memory chunk 200 may be done, for example, by choosing the first memory chunk 200 in the bin or free list found in step 702 or may be done by executing any other known method for choosing an available memory chunk 200 from a bin or free list respectively.

After an available memory chunk 200 has been found 705, the state of the found memory chunk 200 is set to used state, i.e. the step 602 as explained above is executed. Thus, the found memory chunk 200 is unlinked from the free list, in which it was found. I.e., the found memory chunk 200 is removed from the respective free list. The used state is noted in the state field 302 of the footer 201, 300 and/or of the header 203, 300 of the found memory chunk 200.

Subsequently, also the above described verification step 603 and, if required, the step 604 are executed.

If the verification executed in step 603 results in a right-adjacent memory chunk 200, state of which is the free state, the right-adjacent memory chunk 200 is linked into a corresponding free list of the segregated free lists in step 605. Particularly, steps 706 and 707 are executed according to the present embodiment, wherein said steps 706, 707 correspond to sub-steps of step 605 according to the present embodiment. In step 706, a bin or free list respectively is determined for the right-adjacent memory chunk 200. For this purpose, the size of the right-adjacent memory chunk 200 is determined. Then, a search procedure is executed in the free-list table or array 101, wherein a bin or free list respectively is sought, which holds memory chunks 200 having the same size as the right-adjacent memory chunk 200. Subsequently, in step 707, the right-adjacent memory chunk 200 is linked into the bin or free list respectively, found in step 706.

Finally, the state of the right-adjacent memory chunk 200 is set to linked state in step 606, which has been already described above.

Figure 8:
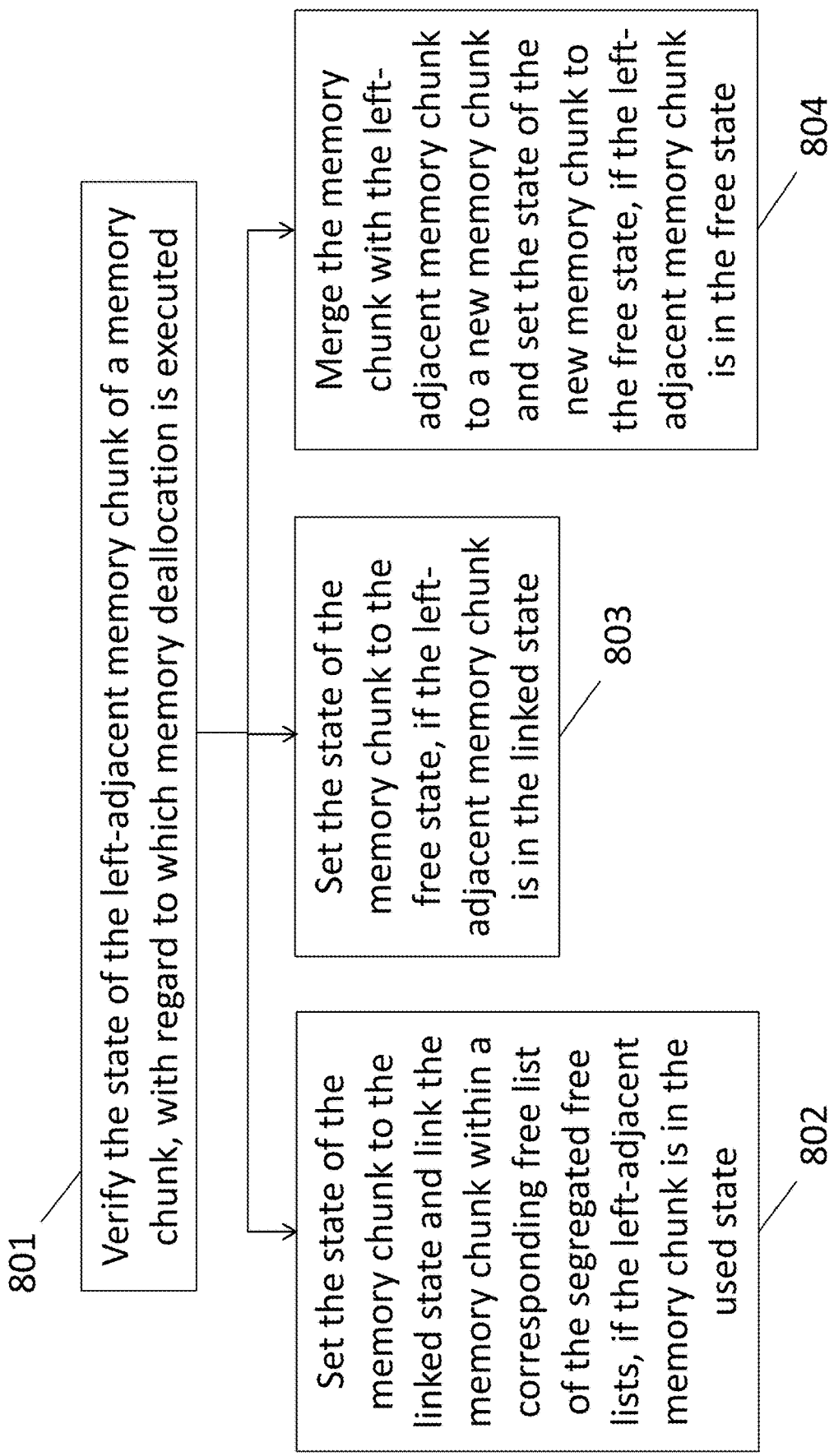
FIG. 8 shows a flow-diagram of memory deallocation according to an embodiment of the present disclosure.

FIG. 8 shows a flow-diagram of memory deallocation according to an embodiment of the present disclosure. As indicated above, the steps of the memory deallocation are executed, for example, by the memory management device 500. Particularly, said steps are executed by the one or more processing units 501 of the memory management device 500.

In step 801, a received memory deallocation request is present by use of which a deallocation of a particular block or memory chunk 200 indicated in the memory deallocation request is requested. The memory deallocation request may be issued by a further device, configured to process data, or by an application. The further device or the application represents, for example, the further device or the application that requested the allocation of the particular block or memory chunk 200. In response to the presence (e.g., reception) of the memory deallocation request (e.g., by the allocator or memory management device 500), the memory deallocation as exemplary shown in FIG. 8 is executed.

In step 801, the state of the left-adjacent memory chunk 200 of the memory chunk 200, with regard to which the memory deallocation is executed, is verified. The left-adjacent memory chunk 200 is a memory chunk 200 that represents the left-adjacent memory chunk 200 in the memory or memory block 102. For this purpose, the state field 302 of the header 201, 300 and/or of the footer 203, 300 of the left-adjacent memory chunk 200 is considered. The state of the left-adjacent memory chunk 200 is read-out from the state field 302 of the header 201, 300 and/or of the footer 203, 300 of the left-adjacent memory chunk 200.

In step 802, if the left-adjacent memory chunk is in the used state, the state of the memory chunk 200, with regard to which the memory deallocation is executed, is set to the linked state and said memory chunk 200 is linked within a corresponding free list of the segregated free lists. The setting to the linked state is done by setting the state field 302 of the header 201, 300 and/or of the footer 203, 300 of the memory chunk 200 to the linked state. The linking of the memory chunk 200 is executed by searching for a free list or bin respectively in the segregated free lists, which comprises or holds memory chunks 200 having the same size as said memory chunk 200 to be linked and by linking said memory chunk 200 into the found free list. The search for a free list or bin respectively is executed, for example, by running through the free list table or array 101. For this purpose, for example, items or bins respectively of the free list table or array 101 are considered, wherein, for each considered item or bin respectively, the size of memory chunks 200 of the free list, to which the bin points to, is compared with the size of the memory chunk 200, with regard to which the memory deallocation is executed. When the corresponding free list or bin respectively has been found, the memory chunk 200, with regard to which the memory deallocation is executed, is linked into the found free list.

In step 803, if the left-adjacent memory chunk 200 is in the linked state, the state of the memory chunk 200, with regard to which the memory deallocation is executed, is set to the free state. For this purpose, the state field 302 of the header 201, 300 and/or of the footer 203, 300 of the memory chunk 200, with regard to which the memory deallocation is executed, is set to the free state.

In step 804, if the left-adjacent memory chunk 200 is in the free state, the memory chunk 200, with regard to which the memory deallocation is executed, is merged with the left-adjacent memory chunk 200 to a new memory chunk 200 and the state of the new memory chunk 200 is set to the free state.

Figure 9:
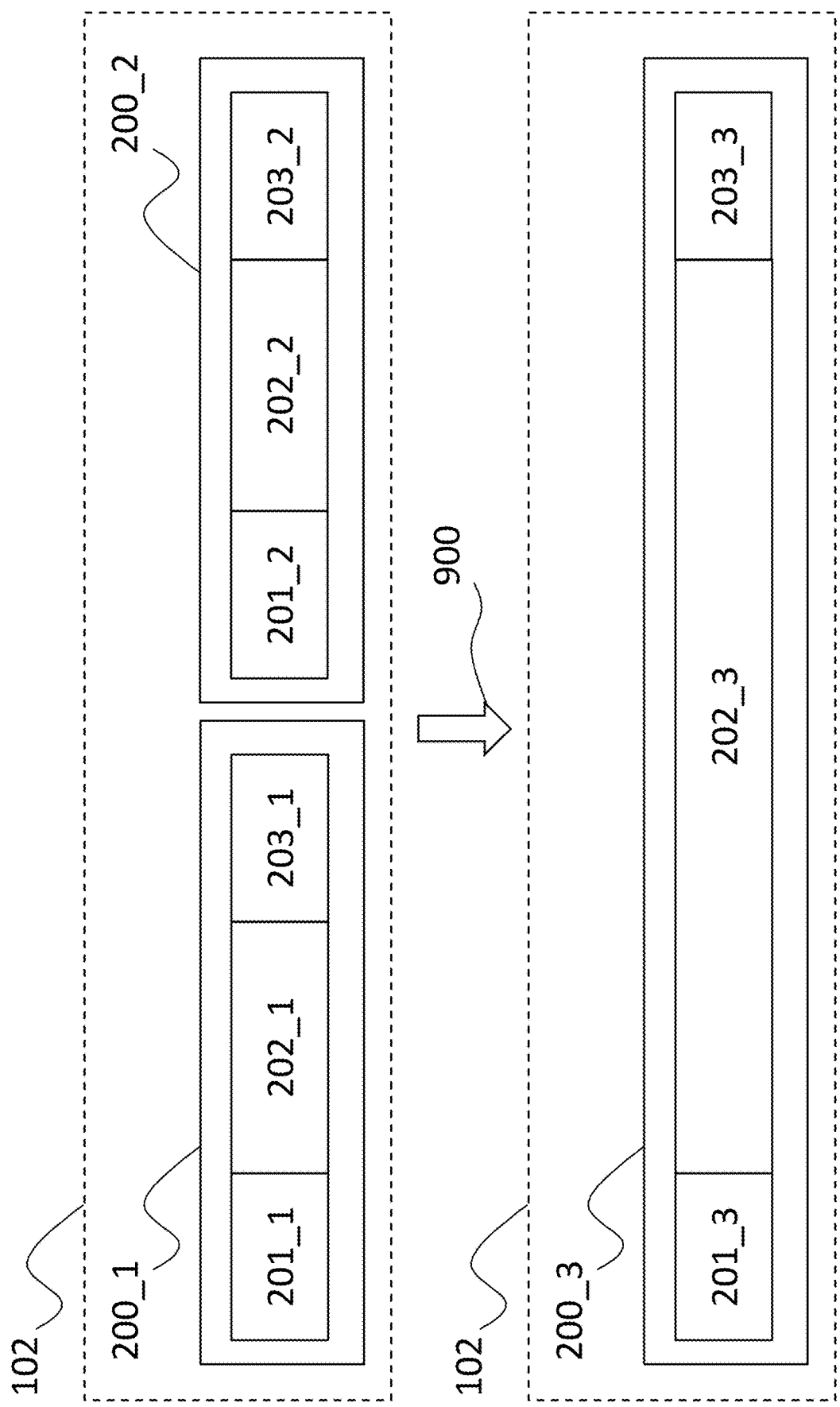
FIG. 9 shows a merging of two memory chunks according to an embodiment of the present disclosure.

FIG. 9 shows a merging 900 of two memory chunks 200_1, 200_2 according to an embodiment of the present disclosure. The memory chunks 200_1, 200_2 are arranged as explained above.

In the upper part of FIG. 9 the initial situation with two separate memory chunks 200_1 and 200_2, which are adjacent in the memory or memory block 102, is shown. With regard to the memory deallocation as discussed above, the memory chunk 200_1 represents exemplary the left-adjacent memory chunk 200, and the memory chunk 200_2 represents exemplary the memory chunk 200, with regard to which the memory deallocation is executed.

By the execution of the merging 900 of both memory chunks 200_1, 200_2, the footer 203_1 of the left memory chunk 200_1 of the two memory chunks 200_1, 200_2 and the header 201_2 of the right memory chunk 200_2 of the two memory chunks 200_1, 200_2 are merged or joined to one field. Particularly, also the corresponding payload or data fields 202_1, 202_2 of the both memory chunks 200_1, 200_2 are merged or joined. Thus, the merging 900 leads to one (merged or joined) payload or data field 202_3 between the header 201_1 of the left memory chunk 200_1 of the two memory chunks 200_1, 200_2 and the footer 203_2 of the right memory chunk 200_2 of the two memory chunks 200_1, 200_2. The footer 203_1 and the payload or data field 202_1 of the left memory chunk 200_1 of the two memory chunks 200_1, 200_2 and the header 201_2 and the payload or data field 202_2 of the right memory chunk 200_2 of the two memory chunks 200_1, 200_2 are merged or joined on the one payload or data field 202_3.

The new memory chunk 200_3, obtained after the merging 900 (see the lower part of FIG. 9), comprises: a header 201_3 that comprises the header 201_1 of the left memory chunk 200_1 of the two memory chunks 200_1, 200_2; a payload or data field 202_3 that comprises the payload or data field 202_1 and the footer 203_1 of the left memory chunk 200_1 of the two memory chunks 200_1, 200_2 and the header 201_2 and the payload or data field 202_2 of the right memory chunk 200_2 of the two memory chunks 200_1, 200_2; and a footer 203_3 that comprises the footer 203_2 of the right memory chunk 200_2 of the two memory chunks 200_1, 200_2.

Thus, any field between the header 201_1 of the left memory chunk 200_1 of the two memory chunks 200_1, 200_2 and the footer 203_2 of the right memory chunk 200_2 of the two memory chunks 200_1, 200_2 is merged or joined 900 to one payload or data field 202_3 of the new memory chunk 200_3.

When executing the merging 900, the data of the header 201_3 and the footer 203_3 are updated such that they characterize the new memory chunk 200_3. E.g., the size field 301 of the header 201_3 and/or the footer 203_3 of the new memory chunk 200_3 indicates the size of the new memory chunk 200_3. The state field 302 of the header 201_3 and/or the footer 203_3 of the new memory chunk 200_3, for example, indicates the state of the new memory chunk 200_3.

When turning back to the merging executed during the deallocation procedure and when assuming that the new memory chunk 200_3 is the new memory chunk obtained by the merging 900 executed during the deallocation procedure, after the merging 900, the state of the new memory chunk 200_3 is set to the free state. Thus, the state field 302 of the header 201_3 and/or of the footer 203_3 of the new memory chunk 200 is set to the free state after the merging 900.

Thus, the present disclosure is directed to a memory management method and to a memory management device arranged to execute memory allocation and/or memory deallocation by use of segregated free lists, which provide information on memory chunks, wherein the memory allocation and/or the memory deallocation are executed according to states of the memory chunks, and wherein the states of the memory chunks comprise: an used state indicating that a memory chunk, which is in used state, is in use, and is not available for allocation; a linked state indicating that a memory chunk, which is in linked state, is not used, is linked within a free list of the segregated free lists, and is available for allocation; a free state indicating that a memory chunk, which is in free state, is not used, is not linked within any of the segregated free lists, and is not available for allocation.

By the memory management method and the memory management device an improved memory management, in particular, an improved memory allocation and/or memory deallocation are enabled. In particular, an efficient memory allocation and/or deallocation are allowed. Further, the memory reclamation mechanism is improved despite the continuously or permanently executed memory allocations and/or deallocations.

The disclosure has been described in conjunction with various embodiments herein. The various embodiments of the present disclosure are combinable with each other. I.e. any embodiment of the embodiments, described herein, shown in at least one of the figures, and/or claimed in appended claims, is combinable with another embodiment of said embodiments. Thus, a flexible implementation of the present disclosure is enabled. Furthermore, the implementation of the present disclosure can be adapted to several environments or use cases.

Additionally, also other variations to the enclosed embodiments can be understood and effected by those skilled in the art and practicing the claimed disclosure, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A memory management method, comprising:
finding a first memory chunk within a free list segregated free lists in a memory block split into memory chunks of different sizes each free list represented by a chain of memory chunks of a same size, each memory chunk in the memory block having information on a state of the memory chunk, wherein the state of the memory chunk is one of a used state, a linked state, or a free state, the used state for indicating a memory chunk in use and not available for allocation, the linked state for indicating a memory chunk that is not used, linked within a free list of the segregated free lists, and available for allocation, and the free state for indicating a memory chunk that is not used, not linked within any of the segregated free lists, and is not available for allocation;
unlinking the first memory chunk from the free list of the segregated free lists, and setting the state of the first memory chunk to the used state;
determining that a right-adjacent memory chunk of the first memory chunk is in the free state; and
linking the right-adjacent memory chunk into a corresponding free list of the segregated free lists and setting the state of the right-adjacent memory chunk to the linked state.

2. The memory management method according to claim 1, further comprising:
executing memory deallocation by:
verifying a state of a left-adjacent memory chunk of the first memory chunk;
setting the state of the first memory chunk to the linked state and linking the first memory chunk within a corresponding free list of the segregated free lists when the left-adjacent memory chunk is in the used state, or setting the state of the first memory chunk to the free state when the left-adjacent memory chunk is in the linked state; and
merging the first memory chunk and the left-adjacent memory chunk to a new memory chunk and setting the state of the new memory chunk to the free state when the left-adjacent memory chunk is in the free state.

3. The memory management method according to claim 2, wherein the segregated free lists are singly-linked.

4. The memory management method according to claim 2, further comprising:
terminating memory allocation when the right-adjacent memory chunk of the first memory chunk is not in the free state.

5. The memory management method according to claim 2, wherein each memory chunk of the memory chunks comprises a header and a footer, and wherein at least one of the header or the footer indicates the state of the respective memory chunk.

6. The memory management method according to claim 5, wherein merging the first memory chunk and the left-adjacent memory chunk comprises:
merging a footer of the left-adjacent memory chunk and a header of the first memory chunk to an area for storage of data.

7. A memory management device, comprising:
a processor;
a memory storage plurality of instructions that, when executed by the processor, cause the device to:
find a first memory chunk within a free list of segregated free lists in a memory block split into memory chunks of different sizes, each free list represented by a chain of memory chunks of a same size, each memory chunk in the memory block having information on a state of the memory chunk, wherein the state of the memory chunk is one of a used state, a linked state, or a free state, the used state for indicating a memory chunk in use and not available for allocation, the linked state for indicating a memory chunk that is not used, linked within a free list of the segregated free lists, and available for allocation, and the free state for indicating a memory chunk that is not used, not linked within any of the segregated free lists, and is not available for allocation;
unlink the first memory chunk from the free list of the segregated free lists, and set the state of the first memory chunk to the used state;
verify whether a right-adjacent memory chunk of the first memory chunk in memory is in the free state; and
when the right-adjacent memory chunk is in the free state, link the right-adjacent memory chunk into a corresponding free list of the segregated free lists and set the state of the right-adjacent memory chunk to the linked state.

8. The memory management device according to claim 7, wherein the instructions, when executed by the processor, cause the device to:
execute memory deallocation comprising:
verify the state of a left-adjacent memory chunk of the first memory chunk;
set the state of the first memory chunk to the linked state and link the first memory chunk within a corresponding free list of the segregated free lists when the left-adjacent memory chunk is in the used state, or set the state of the first memory chunk to the free state when the left-adjacent memory chunk is in the linked state; and
merge the first memory chunk and the left-adjacent memory chunk to a new memory chunk and set the state of the new memory chunk to the free state when the left-adjacent memory chunk is in the free state.

9. The memory management device according to claim 8, wherein the segregated free lists are singly-linked.

10. The memory management device according to claim 8, wherein the instructions, when executed by the processor, cause the device to:
terminate the memory allocation action when the right-adjacent memory chunk of the first memory chunk is not in the free state.

11. The memory management device according to claim 8, wherein each memory chunk of the memory chunks comprises a header and a footer, and wherein at least on of the header or the footer indicates the state of the respective memory chunk.

12. The memory management device according to claim 11, wherein to merge the first memory chunk and the left-adjacent memory chunk, the instructions, when executed by the processor, cause the device to:
merge a footer of the left-adjacent memory chunk and a header of the first memory chunk to an area for storage of data.

13. A non-transitory machine-readable medium having instructions stored therein for managing memory, the instructions, when executed by a processor, causing the processor to perform operations, the operations comprising:
finding a first memory chunk within a free list of segregated free lists in a memory block split into memory chunks of different sizes, each free list represented by a chain of memory chunks of a same size, each memory chunk in the memory block having information on a state of the memory chunk, wherein the state of the memory chunk is one of a used state, a linked state, or a free state, the used state for indicating a memory chunk in use and not available for allocation, the linked state for indicating a memory chunk that is not used, linked within a free list of the segregated free lists, and available for allocation, and the free state for indicating a memory chunk that is not used, not linked within any of the segregated free lists, and is not available for allocation;
unlinking the first memory chunk from the free list of the segregated free lists, and setting the state of the first memory chunk to the used state;
determining that a right-adjacent memory chunk of the first memory chunk is in the free state; and
linking the right-adjacent memory chunk into a corresponding free list of the segregated free lists and setting the state of the right-adjacent memory chunk to the linked state.

14. The non-transitory machine-readable medium according to claim 13, the operations further comprising:
executing memory deallocation by:
verifying a state of a left-adjacent memory chunk of the first memory chunk;
setting the state of the first memory chunk to the linked state and linking the first memory chunk within a corresponding free list of the segregated free lists when the left-adjacent memory chunk is in the used state, or setting the state of the first memory chunk to the free state when the left-adjacent memory chunk is in the linked state; and
merging the first memory chunk and the left-adjacent memory chunk to a new memory chunk and setting the state of the new memory chunk to the free state when the left-adjacent memory chunk is in the free state.

15. The non-transitory machine-readable medium according to claim 14, wherein the segregated free lists are singly-linked.

16. The non-transitory machine-readable medium according to claim 14, the operations further comprising:
terminating memory allocation when the right-adjacent memory chunk of the first memory chunk is not in the free state.

17. The non-transitory machine-readable medium according to claim 14, wherein each memory chunk of the memory chunks comprises a header and a footer, and wherein at least one of the header or the footer indicates the state of the respective memory chunk.

18. The non-transitory machine-readable medium according to claim 17, wherein merging the first memory chunk and the left-adjacent memory chunk comprises:

merging a footer of the left-adjacent memory chunk and a header of the first memory chunk to an area for storage of data.

\* \* \* \* \*

UNITED STATES PATENT AND TRADEMARK OFFICE
CERTIFICATE OF CORRECTION

Page 1 of 1

PATENT NO.         : 11,042,477 B2
APPLICATION NO.    : 16/366725
DATED              : June 22, 2021
INVENTOR(S)        : Aleksandr Aleksandrovich Simak, Peter Sergeevich Krinov and Xuecang Zhang It is certified that error appears in the above-identified patent and that said Letters Patent is hereby corrected as shown below:

In the Claims

In Claim 1, Column 16, Line 20, delete "free list segregated" and insert --free list of segregated--.

In Claim 1, Column 16, Line 22, delete "different sizes each free" and insert --different sizes, each free--.

In Claim 7, Column 17, Line 12, delete "a memory storage plurality" and insert --a memory storing a plurality--.

In Claim 11, Column 18, Line 1, delete "at least on of" and insert --at least one of--.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*